United States Patent [19]
Hohnl

[11] Patent Number: 5,254,046
[45] Date of Patent: Oct. 19, 1993

[54] BELT RETAINER

[75] Inventor: Gary D. Hohnl, Slinger, Wis.

[73] Assignee: Deere & Company, Moline, Ill.

[21] Appl. No.: 904,744

[22] Filed: Jun. 26, 1992

[51] Int. Cl.$^5$ .............................................. F16H 7/08
[52] U.S. Cl. .................................... 474/101; 474/113
[58] Field of Search ........ 474/101, 109, 111, 113–117, 474/133–138

[56] References Cited

U.S. PATENT DOCUMENTS

| | | | |
|---|---|---|---|
| 2,856,785 | 10/1958 | Steele | 474/113 |
| 2,970,587 | 2/1961 | Estes | 474/113 X |
| 4,337,055 | 6/1982 | Mackay et al. | 474/111 |
| 4,713,043 | 12/1987 | Biedermann | 474/111 |
| 4,826,469 | 5/1989 | Cooley | 474/113 X |
| 4,969,859 | 11/1990 | Holbrook | 474/138 |

Primary Examiner—Thuy M. Bui

[57] ABSTRACT

An adjustable belt retainer is provided for use with a belt driven mechanism, such as an auxiliary blower for a mower deck. The retainer allows quick and easy adjustment between a belt retaining and a belt removal position. Its L-shaped with one leg being slidably mounted to the housing, the other leg extending adjacent the belt near its contact with the pulley. A releasable stop is provided between the housing and retainer being biased towards engagement to maintain a retainer in its belt retaining position. A finger handle is provided to allow the operator to disengage the stop easily without the need for tools and guide surfaces are provided to allow quick and easy sliding adjustment of the retainer between its two positions.

7 Claims, 4 Drawing Sheets

BELT RETAINER

TECHNICAL FIELD

The present invention relates to belt driven devices, and more specifically to a belt retainer for use with an auxiliary blower carried on the mower deck of a lawn and garden vehicle.

Belt drives are commonly used for operating multi-spindle rotary mowers, as well as auxiliary blowers which are provided to assist in moving the grass cut by the mower to a bagger or collection device.

The belt drives for such blowers frequently follow paths from the mower deck to the blower and change direction. As they are redirected, the belts often twist, with some tendency to come off the pulley. Accordingly, belt retainers are provided to help maintain the belt within the pulley during operation.

Belt retainers are further useful in maintaining belts within a pulley when it has been loosened, as for example, occurs when the belt is adjusted or other blower parts are checked for proper operation. The retainers are also useful when the blower is removed from the mower deck for storage and the belt is loose.

The retainers must sometimes be removed or adjusted, as when a new belt or other component is installed.

Present belt retainers are mounted to their supports by various fastener means that generally require tools for their removal or adjustment.

It would be desirable, therefore, to provide a retainer which can be quickly and easily adjusted without the assistance of tools to a position where it secures the belt on the pulley or away from the belt to allow for replacement of the belt as necessary.

SUMMARY OF THE INVENTION

The present invention provides a belt retainer which is adjustable to a first position adjacent the belt and pulley to secure the belt in place during its operation or when loosened, as for example can occur if it is removed from associated equipment for storage. The retainer is adjustable to a second position, without the need of tools, to allow the belt to be removed and/or replaced, or to allow the operator to check the operation of the drives and pulleys.

With the adjustable belt retainer, the belt can be maintained in its running path as it twists when entering and exiting pulleys to thereby prevent it from rolling over and coming out of the pulley.

The retainer is further adapted to be easily adjusted by hand to a position where the belt can be removed to replace the belt or to determine whether the pulley is freely rotatable should some binding or other problem occur which would inhibit rotation of the pulley.

The retainer includes a bracket having a first leg that is slidably mounted on a housing adjacent the belt driven pulley, that leg being preferably mounted to the housing through the use of a bolt and slot arrangement. Carried at one end of the first leg is an upstanding second leg which serves to restrict movement of the belt should it begin to come out of the pulley during operation or storage.

Provided on the housing to which the retainer is mounted are guide surfaces at each side of the bracket to assure quick and positive back and forth adjustment. A stop means is provided at one end of the bracket to hold it in its position adjacent the belt and pulley, that stop means including a protrusion in the housing adapted to seat in a recess carried in the first leg of the bracket. The stop means assists not only in positively positioning the retainer in its location adjacent the pulley, but also serves to resist shifting of the bracket whenever the belt tends to climb out of the pulley and push against the second leg of the bracket. The carriage bolt which mounts the bracket to the housing is provided with a spring washer having a curved configuration to create a downward bias that assists in retaining the stop means in an engaged position. In place of the curved spring washer, a built-in resiliency or bias can be provided in the first leg that would help urge its center portion away from the housing into abutment with the nut that holds it in place.

At one end of the bracket is provided a finger handle that allows the operator to easily lift the end of the bracket to disengage the stop means and shift the bracket away from the pulley, or alternatively slide the bracket toward the pulley as necessary.

DESCRIPTION OF THE PREFERRED EMBODIMENT

Figure 1:
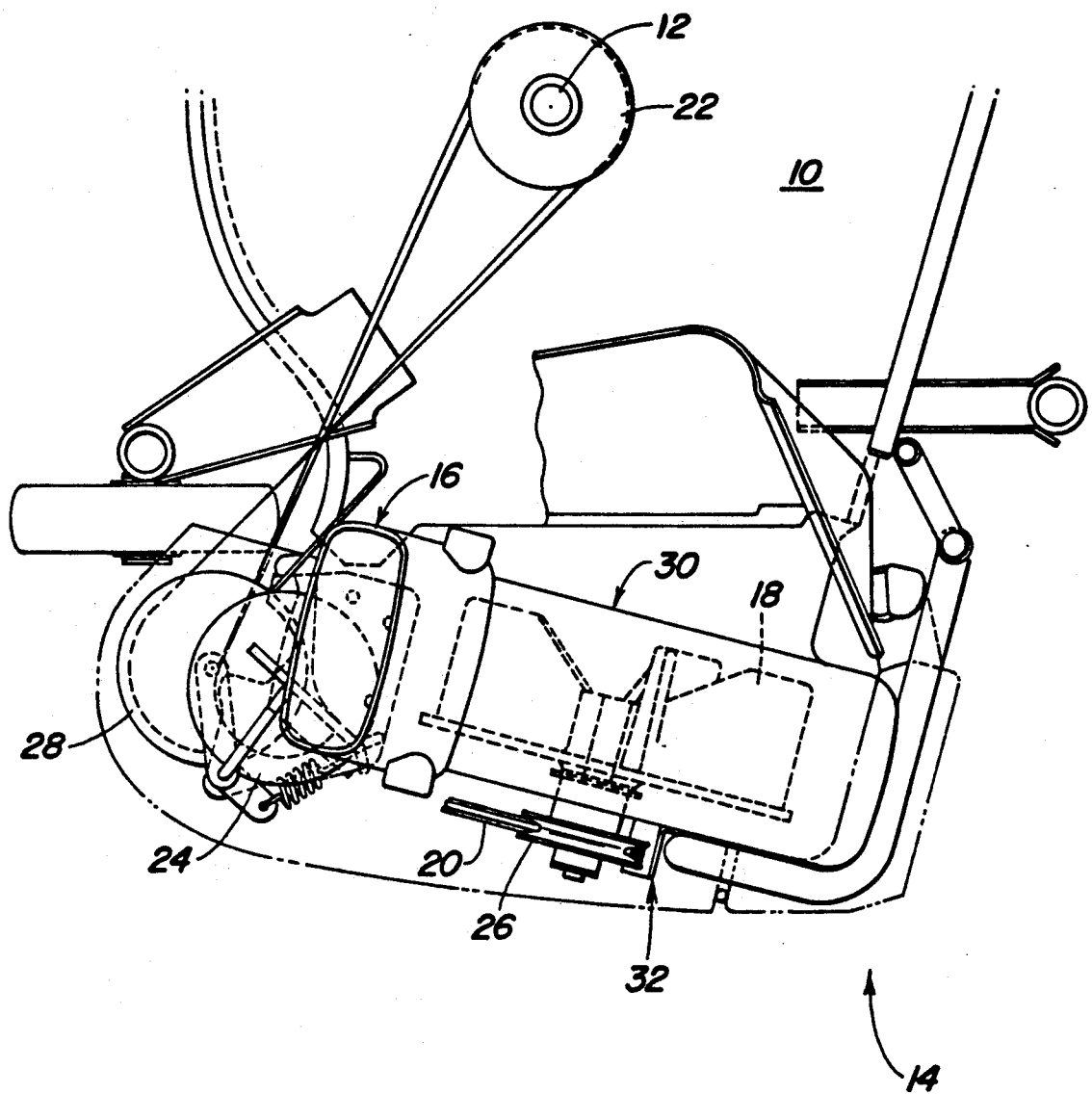
FIG. 1 is an enlarged partial plan view of a mower deck, the blower assist and belt drive with which the belt retainer is utilized.
Figure 2:
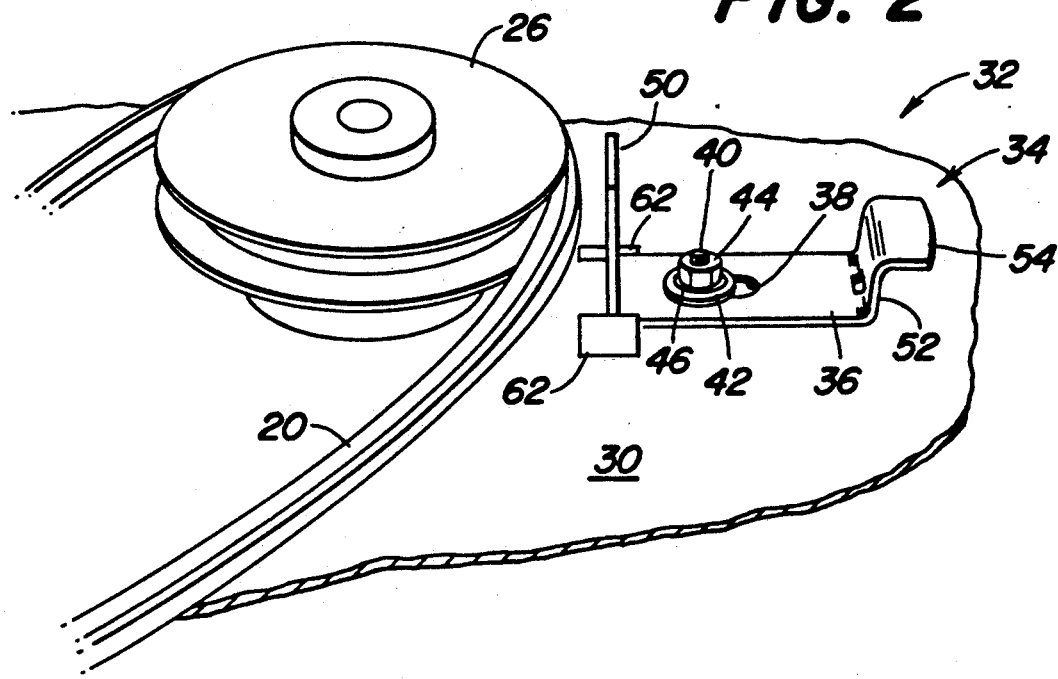
FIG. 2 is an elevated perspective of a belt, pulley and the adjustable retainer.

Looking first to FIG. 1, there is illustrated in part a multi-spindle mower deck 10, only one blade driven spindle 12 being illustrated. Coupled with the deck 10 is a blower assist 14 designed to enhance the air stream that conveys material cut by the deck 10 through the outlet duct 16 and to a material collection system, such as a bagger. This equipment would typically be propelled by a vehicle such as a lawn and garden tractor.

The blower assist 14 includes a fan blade or impeller 18 which is supported for rotation about a generally horizontally extending axis and driven by a belt 20 powered by the mower spindle 12. The belt 20 is entrained about the rotary blade spindle pulley 22, an idler pulley 24, the impeller pulley 26, and tensioning pulley 28. In its path around these pulleys 22, 24, 26 and 28, the belt 20 changes direction and is also twisted about right angles.

Figure 5:
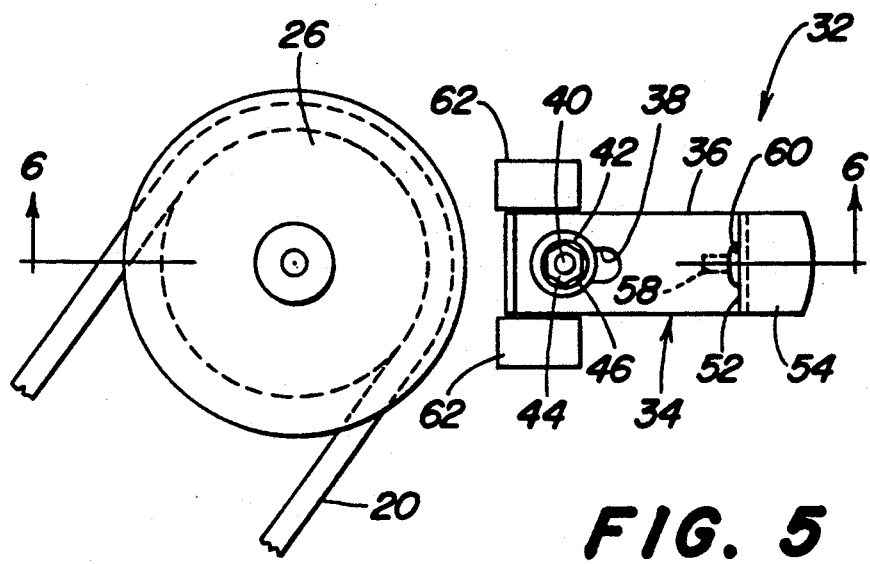
FIG. 5 is a plan view of a pulley, belt and retainer with the retainer in its position spaced from the belt.
Figure 6:
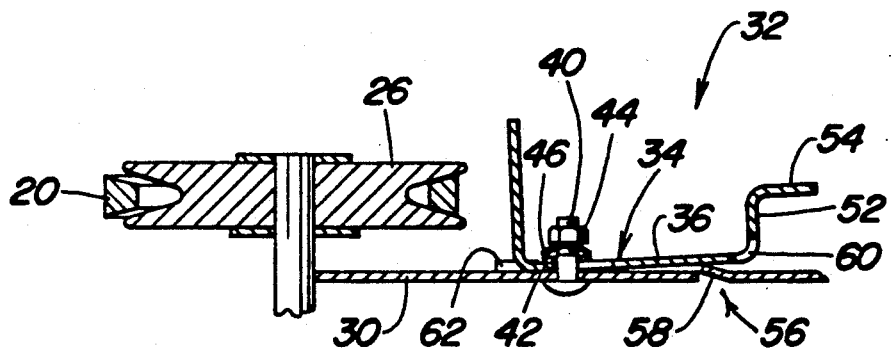
FIG. 6 is a side view of the structure illustrated in FIG. 5.
Figure 7:
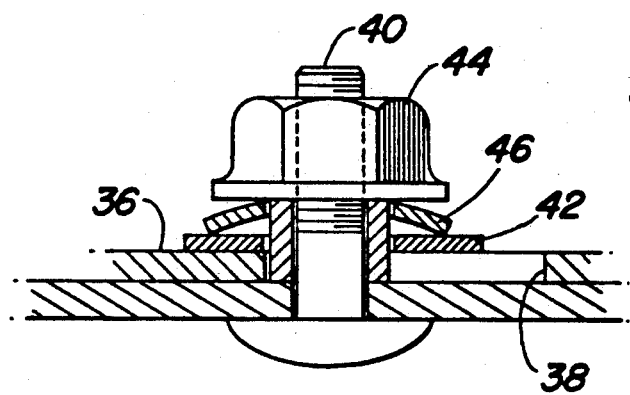
FIG. 7 is an enlarged schematic of the bolt and spring washer preferably used with the bracket.
Figure 8:
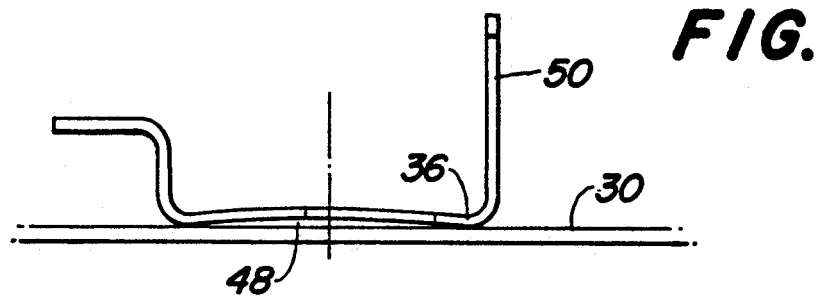
FIG. 8 is a schematic view of an alternative retainer bracket having a bow in the resilient bottom leg member.
Figure 9:
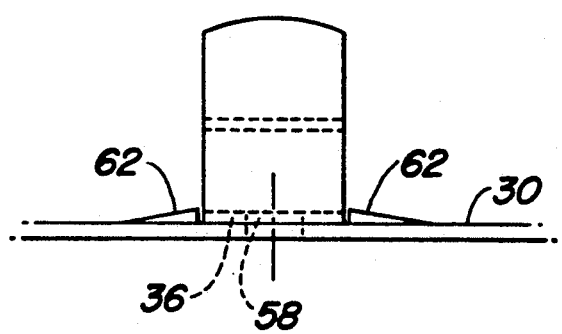
FIG. 9 is an end view of just the bracket shown in FIG. 2.

Carried on the blower housing 30 which encloses the blower fan 18 is a belt retaining means 32, as is better illustrated in FIGS. 2-9. The retaining means 32 is carried adjacent the fan or impeller pulley 26 and is adjustable to allow for movement between a first position adjacent the impeller pulley 26 (FIGS. 3 and 4) and a second position spaced therefrom (FIGS. 5 and 6).

The retaining means includes a retainer bracket 34 which has a first leg 36 that is preferably flat. Extending through the slot 38 and securing the first leg 36 of the bracket 34 to the housing 30 is a bolt 40, along with a washer 42 and nut 44 and, as is better illustrated in FIG. 7, a spring loaded ring washer 46 to give the first leg a downward bias. Alternatively, the first leg 36 could be formed of resilient material with a concave 48 to provide a downward bias (see FIG. 8). A second upstanding leg 50 is connected to one end of the first or bottom leg 36. The second leg 50 serves to provide a surface against which the belt 20 abuts and slides when it tends to come off the pulley 26, as when it might twist or become loose.

Carried at the other end of the bracket 34 is an upstanding shorter leg 52 with a turned over and generally horizontal finger hook 54 that can be raised to disengage the stop means 56 provided between the bracket 32 and housing 30. The stop means 56 includes a protrusion or raised surface 58 formed in the housing 30 which is receivable in a recess 60 formed in the bracket first leg 36.

Provided in the housing and to each side of first leg 36 are raised surfaces 62 which serve as guides to facilitate positive back and forth movement of the bracket 34 between its two positions of adjustment.

In operation, the belt 20 which drives the blower pulley 26 would be entrained around the pulley 22 carried by the rotary blade spindle 12 following a path about a vertical axis and then as schematically illustrated in FIG. 1. The belt 20 would then be twisted as it passes around the guide pulley 24 and turns 90° to pass about the horizontal axis of the fan blade pulley 26. As the belt 20 enters the fan pulley 26, it is confined within the pulley jaws by the vertically extending second leg 50 of the retaining bracket 34. The spring washer 46 serves to bias the bracket 34 downwardly, yet allows the operator to raise it and slide it to an alternate position. The stop means 56 provided at the bracket's other end is maintained in its engaged configuration by the spring bias and secures the bracket 34 in place as the belt 20 pushes against the second or upstanding leg 50 of the bracket 34.

The retaining means 32 is easily adjusted by the operator. Placing his finger under the horizontally extending leg 54, he lifts the bracket 34 to disengage the stop means 56 and then slides the bracket 34 away from the pulley 26.

Serving to retain the stop means 56 in an engaged position and secure the bracket 34 against movement when the belt 20 pushes against the second leg 50 is the moment generated by contact of the belt 20 on the second leg 50 at a point above the horizontal plane of the first leg 36 and the stop means 56. The force of the belt 20 acting through the length between the area of belt contact and horizontal plane of the first leg 36 serves to urge the recess 60 in the first leg 36 down and onto the protrusion 58, securing the bracket 34 in place.

Figure 3:
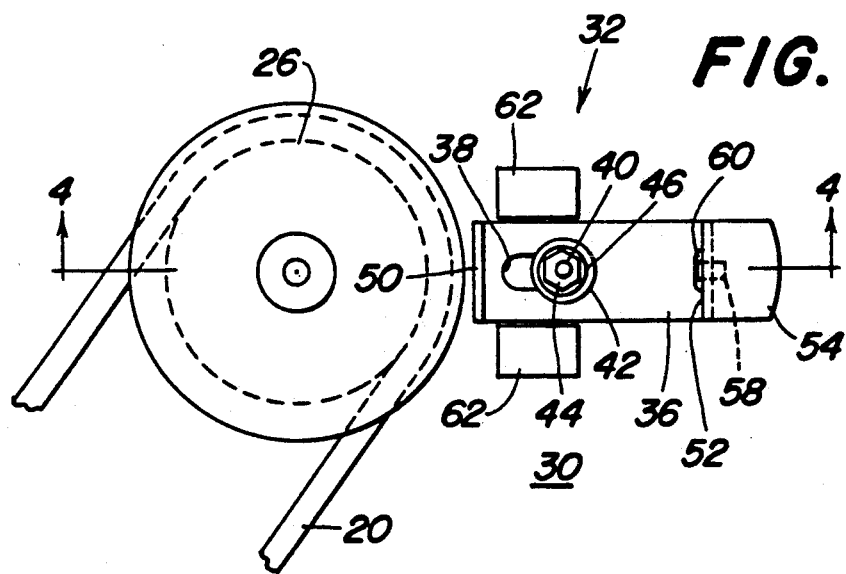
FIG. 3 is a partial plan schematic of a pulley, belt and retainer with the retainer in its belt retaining position.
Figure 4:
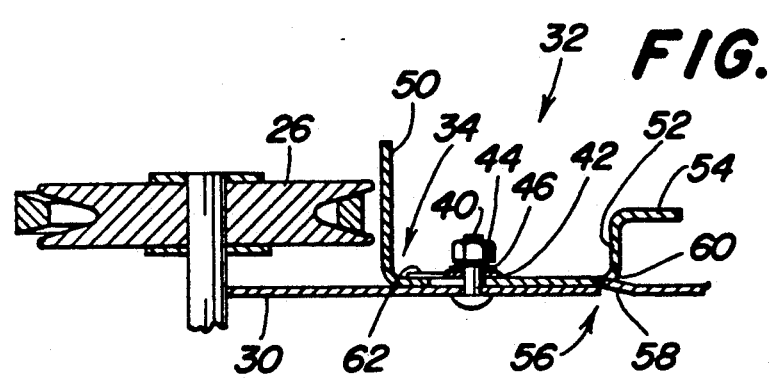
FIG. 4 is a side view of the structure illustrated in FIG. 3.

With the adjustable retaining means provided herein, an operator needs no tools to quickly and easily move the retaining means between its positions illustrated in FIGS. 3 and 5. He simply lifts up on the finger handle and slides the bracket along the guide path.

The retainer serves not only to hold the belt in place during operation, but to prevent it from coming off the pulley when the unit is not in operation and particularly when the belt is loosened and not in a drive mode as, for example, will occur when the blower assist is taken off of the mower deck and stored.

With the invention as described and illustrated, there is provided a quickly adjustable, rather inexpensive belt retainer means that requires few tools for installation and requires no tools for adjustment.

I claim:

1. Retaining means usable with a rotatable pulley carried on a housing and an endless drive element entrained around the pulley, the retaining means including:
   a bracket having a first leg slidably mounted to the housing and a second upstanding leg joined with the first, the bracket being shiftable between
      a first position whereat the second leg is adjacent the endless drive element and
      a second position whereat the second leg is spaced from the endless drive element;
   stop means between the bracket and housing for releasably securing the bracket in its first position and
   means biasing the bracket toward the housing for engagement with the stop means.

2. The invention defined in claim 1 wherein the means biasing the bracket includes a spring washer adapted to urge the first leg towards the housing.

3. The invention defined in claim 1 wherein the means biasing includes a resilient first leg which is slidably secured to and biased away from the housing.

4. The invention defined in claim 1 wherein the bracket is further provided with a handle for overcoming the biasing means and disengaging the stop means to permit sliding movement of the bracket from its first position.

5. Belt retaining means usable with a rotatable pulley carried on a housing and a belt entrained around the pulley, the retaining means including:
   a first leg slidably mounted to the housing and shiftable between
      a first position adjacent the belt, and
      a second position spaced from the belt;
   a second leg joined to the first leg and projecting upwardly therefrom to retain the belt within the pulley when the first leg is in its first position;
   releasable stop means between the first leg and the housing to restrict shifting movement of the leg from its first position or permit such movement when released;
   means biasing the first leg towards the housing to restrict shifting movement of the leg relative to the housing.

6. Retaining means usable with a rotatable pulley carried on a housing and an endless drive element entrained around the pulley, the retaining means including:
   a bracket having a first leg slidably mounted to the housing and a second upstanding leg joined with the first, the bracket being shiftable between
      a first position whereat the second leg is adjacent the endless drive element and
      a second position whereat the second leg is spaced from the endless drive element; and
   stop means between the bracket and housing for releasably securing the bracket in its first position, the stop means including an upstanding protrusion in the housing that is registrable with a recess provided in the bracket.

7. Retaining means usable with a rotatable pulley carried on a housing and an endless drive element entrained around the pulley, the retaining means including:
- a bracket having a first leg slidably mounted to the housing and a second upstanding leg joined with the first, the bracket being shiftable between
  - a first position whereat the second leg is adjacent the endless drive element and
  - a second position whereat the second leg is spaced from the endless drive element;
- fastening means between the last leg and the housing;
- stop means between the bracket and housing for releasably securing the bracket in its first position, and
- a slot carried in the last leg for preventing shifting movement of the bracket relative to the fastening means.

* * * * *

UNITED STATES PATENT AND TRADEMARK OFFICE
CERTIFICATE OF CORRECTION

PATENT NO. : 5,254,046
DATED : 19 October 1993
INVENTOR(S) : Gary David Hohnl

It is certified that error appears in the above-indentified patent and that said Letters Patent is hereby corrected as shown below:

Col. 6, line 3, delete "last" and insert --first--.
Col. 6, line 7, delete "last" and insert --first--.

Signed and Sealed this

Twenty-fourth Day of May, 1994

Attest:

BRUCE LEHMAN

*Attesting Officer*   *Commissioner of Patents and Trademarks*